United States Patent
Ahmed et al.

(10) Patent No.: US 11,829,374 B2
(45) Date of Patent: Nov. 28, 2023

(54) DOCUMENT BODY VECTORIZATION AND NOISE-CONTRASTIVE TRAINING

(71) Applicant: Microsoft Technology Licensing, LLC, Redmond, WA (US)

(72) Inventors: Junaid Ahmed, Belleuve, WA (US); Li Xiong, Kirkland, WA (US); Arnold Overwijk, Belleuve, WA (US); Chenyan Xiong, Belleuve, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/207,103

(22) Filed: Mar. 19, 2021

(65) Prior Publication Data

US 2022/0179871 A1   Jun. 9, 2022

Related U.S. Application Data

(60) Provisional application No. 63/121,516, filed on Dec. 4, 2020.

(51) Int. Cl.
*G06F 16/2457* (2019.01)
*G06N 5/04* (2023.01)
*G06N 20/00* (2019.01)

(52) U.S. Cl.
CPC ......... *G06F 16/24578* (2019.01); *G06N 5/04* (2013.01); *G06N 20/00* (2019.01)

(58) Field of Classification Search
CPC .......... G06F 16/2457; G06F 16/24578; G06F 16/93; G06F 16/3326; G06N 20/20; G06N 3/08; G06N 5/04
See application file for complete search history.

(56) References Cited

U.S. PATENT DOCUMENTS

| | | | |
|---|---|---|---|
| 2019/0179796 A1* | 6/2019 | Lakhman | G06K 9/6226 |
| 2019/0205761 A1 | 7/2019 | Wu et al. | |
| 2020/0226126 A1* | 7/2020 | Zou | G06N 3/088 |

(Continued)

FOREIGN PATENT DOCUMENTS

JP   2019164409 A   9/2019

OTHER PUBLICATIONS

"International Search Report and Written Opinion Issued in PCT Application No. PCT/US21/059302", dated Feb. 28, 2022, 12 Pages.

*Primary Examiner* — Hau H Hoang

(57) ABSTRACT

Document embedding vectors for each document of a corpus may be generated by combining embedding vectors for document subparts, thereby yielding a final embedding vector for the document. A machine learning model is trained using a query corpus and the document corpus, where the model generates a ranking score for a given (query, document) pair. During training, rankings scores are generated using the model, such that the training dataset is further refined using the generated ranking scores. For example, top documents and a negative document may be determined for a given query and subsequently used as training data. Multiple negative documents may therefore be determined for a given query. A negative document for a given query may be determined from the negative documents using noise-contrastive estimation. Such determined negative documents may be evaluated using a loss function during model training, thereby yielding a more robust model for search processing.

20 Claims, 9 Drawing Sheets

(56) References Cited

U.S. PATENT DOCUMENTS

| | | | |
|---|---|---|---|
| 2020/0380403 A1* | 12/2020 | Aggarwal | G06N 20/00 |
| 2020/0410390 A1* | 12/2020 | Fu | G06F 11/3466 |
| 2021/0342389 A1* | 11/2021 | Maheshwari | G06N 3/0445 |
| 2021/0374344 A1* | 12/2021 | Wang | G06F 16/3331 |

* cited by examiner

DOCUMENT BODY VECTORIZATION AND NOISE-CONTRASTIVE TRAINING

CROSS-REFERENCE TO RELATED APPLICATION

This application claims priority to U.S. Provisional Application No. 63/121,516, titled "Document Body Vectorization and Noise-Contrastive Training," filed on Dec. 4, 2020, the entire disclosure of which is hereby incorporated by reference in its entirety.

BACKGROUND

Machine learning techniques may be used to identify documents that are responsive to a search query. However, depending on the volume of search queries, the length of or data within documents, and/or the amount of documents, the required computing resources may be prohibitive or may otherwise result in unsatisfactory performance.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to document body vectorization and noise-contrastive training. In examples, embedding vectors for each document of a document corpus are generated by combining embedding vectors for document subparts of a given document to yield a final embedding vector for the document. A machine learning model is trained using a query corpus and the document corpus, where the model generates a ranking score for a given (query, document) pair.

During training, the model is used to generate ranking scores for (query, document) pairs, such that the training dataset used during training is further refined according to the generated ranking scores. For example, a set of top documents and a negative document may be determined for a query in the query corpus and subsequently used as training data accordingly. As training iteratively progresses, multiple negative documents may therefore be determined for a given query. A negative document may be determined for a given query from the associated set of negative documents according to noise-contrastive estimation techniques. Such determined negative documents may then be evaluated as part of a loss function during model training, thereby yielding a more robust machine learning model for machine learning model-based search processing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
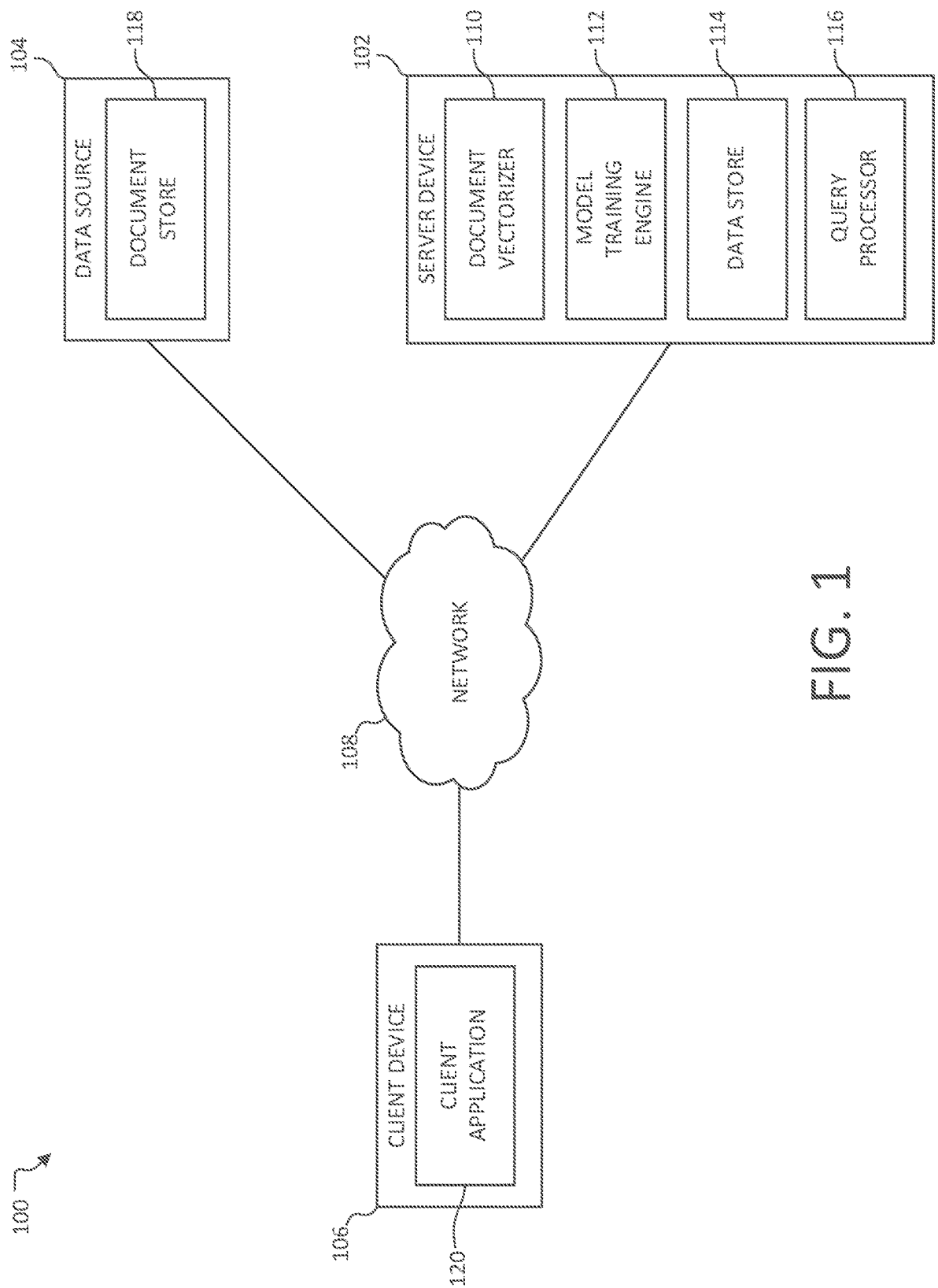
FIG. 1 illustrates an overview of an example system in which the document body vectorization and noise-contrastive training techniques described herein are utilized.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a machine learning model is used to generate a set of documents that is responsive to a search query. For example, an embedding vector may be generated and stored for each document. When a search query is received, a search query embedding vector may be generated, which is compared to the pre-generated document vectors using an evaluation function. As an example, an approximate nearest neighbor (ANN) search may be used. As another example, an interactive machine learning model may be used, where a received query and each document of the set of documents are evaluated online (e.g., rather than using pre-generated document embedding vectors). However, using pre-generated document vectors may yield lower-quality results as compared to interactive techniques, while interactive techniques may be more computationally expensive since each document is evaluated in view of each received search query.

To address such issues, certain approaches may reduce or otherwise limit the amount of data that is used. For example, rather than processing the body of a document, metadata associated with the document (e.g., an anchor, a uniform resource locator (URL), a title of the document, and/or one or more associated clickstreams) may be used to generate a responsive set of documents for a given query instead. However, using such limited data about a document may again yield lower quality results, as such metadata may not be adequate to fully determine the relevance of a document. As such, keyword-searching techniques may typically be used instead of the above-discussed techniques.

Accordingly, aspects of the present disclosure relate to document body vectorization and noise-contrastive training techniques, thereby enabling the efficient use of document bodies for machine learning model-based searching. As an example, a machine learning model is trained using a combination of ANCE (Lee Xiong, Chenyan Xiong, Ye Li, Kwok-Fung Tang, Jialin Liu, Paul Bennett, Junaid Ahmed, and Arnold Overwijk 2020. Approximate Nearest Neighbor Negative Contrastive Learning for Dense Text Retrieval. arXiv preprint arXiv:2007.00808v2) and NCE (Andriy Mnih and Koray Kavukcuoglu. 2013. Learning word embeddings efficiently with noise-contrastive estimation. *Advances in neural information processing systems*). The cited papers are hereby incorporated by reference in their entirety. The machine learning model is trained using a corpus of search queries and a corpus of documents. Queries and documents may each be encoded using a transformer-based encoding model, such as the universal sentence encoder or BERT (Bidirectional Encoder Representations from Transformers).

Thus, the disclosed aspects enable a machine learning model to learn distributed representations of search queries and documents, thereby supporting effective and efficient end-to-end machine learning model-based search processing. Additionally, aspects of the present disclosure leverage language model pre-training, such that it may be used as part of search processing. Such aspects are beneficial as compared to the above-discussed interaction-based techniques, which are computationally expensive and may therefore be limited to re-ranking or may comprise costly online inference if used as part of search processing. Further, the disclosed techniques enable the body of a document to be searched effectively, rather than merely using keyword-based searching on a document body or restricting machine learning model-based search processing to document metadata. Finally, such techniques may be generalizable to international markets, even in instances where most training signals may be from English markets and/or markets having other similar languages.

FIG. 1 illustrates an overview of an example system 100 in which the document body vectorization and noise-contrastive training techniques described herein are utilized. As illustrated, system 100 comprises server device 102, data source 104, client device 106, and network 108. In examples, server device 102, data source 104, and client device 106 communicate using network 108, which may comprise a local area network, a wireless network, or the Internet, or any combination thereof, among other examples.

Server device 102 and data source 104 may each be any of a variety of computing devices, including, but not limited to, a server computing device or a set of computing devices that form a distributed computing device. Similarly, client device 106 may be any of a variety of computing devices, including, but not limited to, a mobile computing device, a laptop computing device, a tablet computing device, or a desktop computing device. It will be appreciated that while system 100 is illustrated as comprising one server device 102, one data source 104, and one client device 106, any number of such elements may be used in other examples. Further, the functionality described herein with respect to server device 102, data source 104, and client device 106 may be distributed among or otherwise implemented on any number of different computing devices in any of a variety of configurations in other examples.

Client device 104 is illustrated as comprising client application 120. Client application 120 may be any of a variety of applications, such as a web application executing in a web browser, a native application, or a combination thereof. For example, a user of client device 104 may use client application 120 to identify a set of documents that are responsive to a search query. Client application 120 may receive a search query from a user, which may be provided to server device 102. Server device 102 may process the search query (e.g., using query processor 116) to determine a set of documents that is responsive to the search query. Accordingly, client application 120 may receive an indication of documents that are responsive to the search query, which may be presented to the user.

In some instances, documents identified as being responsive to a search query are stored or otherwise provided by a data source, such as data source 104. For example, document store 118 of data source 104 may store any of a variety of documents, including, but not limited to, text documents, audio files, video files, and/or webpages of a website. Thus, it will be appreciated that a document may comprise any of a variety of data types. A document may have a body (e.g., the content of the document) and associated metadata (e.g., a title or filename, a URL via which the document is available, a last-modified date, etc.). As another example, an email document may have a body, a subject line, one or more attachments, a sender, and/or one or more recipients. Further, while document store 118 is illustrated as part of data source 104, it will be appreciated that, in other examples, a document store need not be remote from server device 102 and/or client device 106. Thus, it will be appreciated that aspects of the present disclosure may be implemented to provide server-side and/or client-side machine learning-based search processing, among other examples.

Server device 102 is illustrated as comprising document vectorizer 110, model training engine 112, data store 114, and query processor 116. As noted above, a document corpus (e.g., as may comprise documents of one or more document stores such as document store 118) is used to train a model and is subsequently processed to identify a set of documents that is responsive to a search query. Documents of the corpus are encoded to generate document encoding vectors (e.g., using a transformer-based encoding model, such as the universal sentence encoder or BERT) that may be used as an input during model training and subsequent inference.

However, the length of a document may be such that it cannot be encoded into a single encoding vector. As such, rather than condensing the document (e.g., summarizing, downscaling, etc.) or merely using metadata, which may result in information loss and/or decreased model performance, document vectorizer 110 may generate a bag of encodings for a given document, where each encoding is associated with a subpart of the document (e.g., according to sentence breaks, paragraph breaks, a predetermined number of words or bytes, etc.). The bag of encodings may then be used to generate a final encoding for the document. For example, the machine learning model may generate a weight for each token, such that the weights are used to sum the vector of each respective token in the bag of encodings. Encodings for a given document (e.g., an associated final encoding and/or bag of encodings for a given document) may be cached or otherwise stored in data store 114, such that they need not be repeatedly generated by document vectorizer 110. It will be appreciated that any of a variety of weighting techniques may be used.

Model training engine 112 trains a model according to the aspects described herein. As noted above, the model may be trained according to a corpus of search queries and a corpus of documents. As an example, the model may take an input comprising a search query and a document. The model may subsequently generate an output comprising a ranking score for the (search query, document) pair. The corpus of search queries with which the model is trained (e.g., as may be stored by data store 114) may comprise historical search queries and/or representative search queries, among other examples. In some examples, each query of the corpus of search queries further comprises an association with a "positive" document, which is a document that was determined to be responsive to the search query (e.g., a document that ended a user's clickstream for that search or a document explicitly indicated by the user as being responsive to the user's search query).

In examples, model training engine 112 uses ANCE and NCE techniques to train the model. As an example of using ANCE, model training engine 112 may perform a predetermined number of training steps, after which the model is used to perform inference using the full document corpus to generate ranking scores for queries in the corpus of training queries. Thus, model training engine 112 generates a set of relevant documents for the queries using the model in its current state. A subset of top documents may be selected for each query (e.g., according to a predetermined number or above a predetermined ranking score threshold). Additionally, a negative document for each query may be randomly determined from the subset of top documents. It will be appreciated that such selection techniques are provided as examples and that any of a variety of additional or alternative techniques may be used to select positive and/or negative documents. Accordingly, the training corpus may be updated to comprise the subset of top documents and the corpus of training queries, such that model training resumes for the predetermined number of training steps.

As a result, model training engine 112 uses the same data distribution for training as is ultimately used for inference generation. Additionally, such noise-contrastive techniques may improve model performance as a result of learning from stronger negative examples (e.g., as were ranked using the current state of the model). Further, as a result of using ANCE, each training batch yields, for each query, a positive document and a set of negative documents (e.g., as are selected above). NCE may further be used, where the set of negative documents for a search query is processed to select a final negative document for the query from the set of negative documents, which may then be used in an associated loss function. For example, the loss function used by model training engine 112 may leverage binary cross-entropy, as shown in the example loss function below:

$$L = -k_1 \log(\text{sigmoid}(w \cos(M(q), M(d_+)))) - k_2 \log(1 - \text{sigmoid}(w \cos(M(q), M(d_-))))$$

In the example equation above, $M(d_t)$ is a positive document vector (e.g., a document that is responsive to a given query q, as may be determined from a user's clickstream or based on a user indication), $M(d\ldots)$ is a negative document vector (e.g., as may be obtained using ACNE and/or NCE, as described above), $M(q)$ is a query vector, and $\cos(u, v)$ denotes the cosine similarity of u and v. Variables w, $k_1$, and $k_2$ are constants that can be used to tune the loss function. For example, a larger value for w may ultimately yield a less robust model.

Accordingly, query processor 116 uses the trained model to process queries (e.g., as may be received from client application 120 of client device 106) and generate a set of documents that is responsive to the query accordingly. As an example, query processor 116 generates an embedding vector for a received query. As noted above, data store 114 may store embedding vectors for documents, such that query processor 116 uses the trained model to process the query embedding vector in view of the document embedding vectors stored by data store 114, thereby generating a responsive set of documents. For example, a dot-product ANN search may be used, such that query processor 116 generates a set of documents responsive to the query that may be returned to client device 106. The returned set of documents may comprise references to the identified documents and/or excerpts from the documents, among other examples. For example, the excerpts may be relevant keywords or excerpts from the documents.

Figure 2:
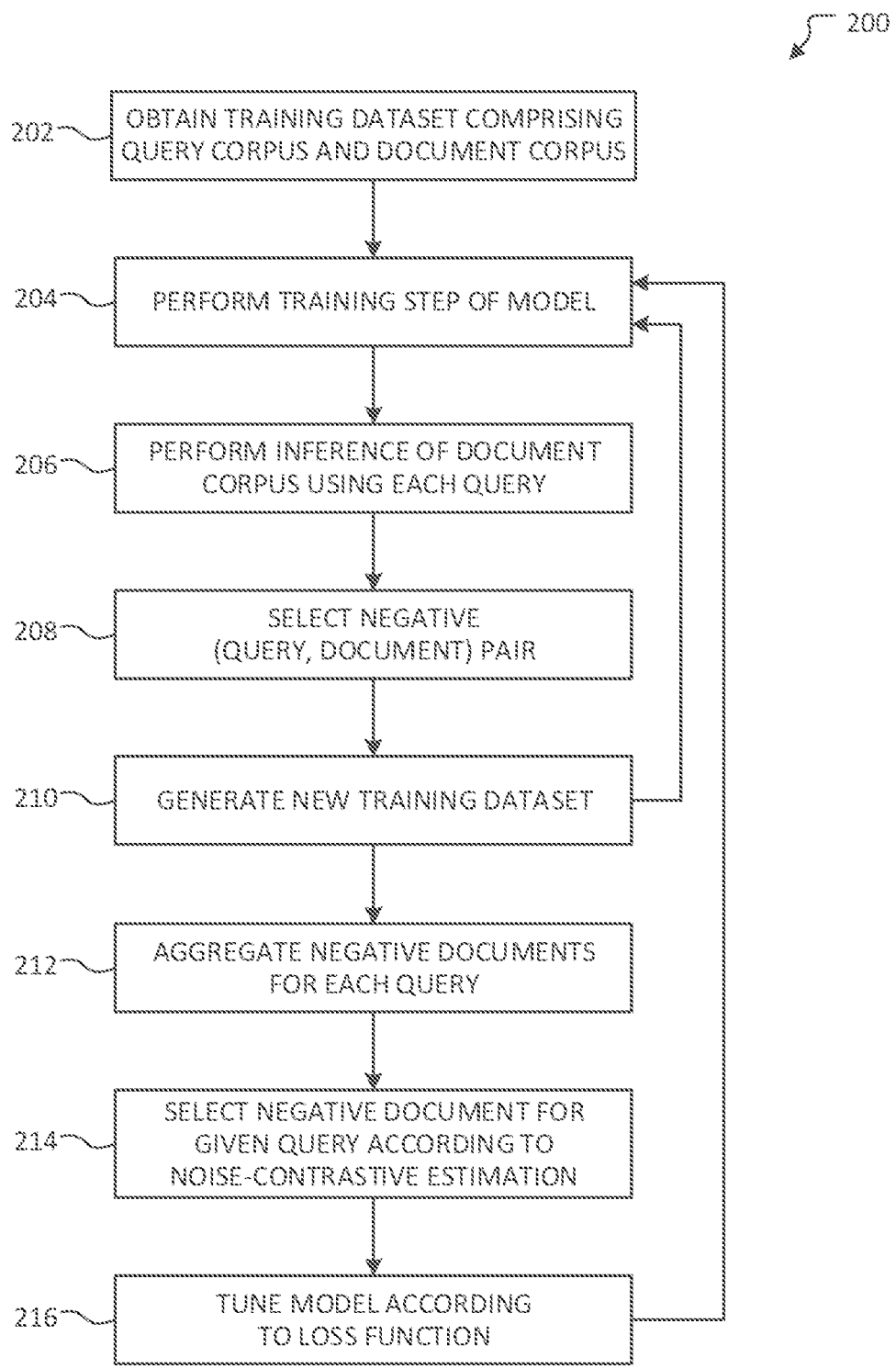
FIG. 2 illustrates an overview of an example method for training a machine learning model according to the document body vectorization and noise-contrastive training techniques of the present disclosure.

FIG. 2 illustrates an overview of an example method 200 for training a machine learning model according to the document body vectorization and noise-contrastive training techniques of the present disclosure. In examples, aspects of method 200 are performed by a model training engine, such as model training engine 112 in FIG. 1.

Method 200 begins at operation 202, where a training dataset comprising a query corpus and a document corpus is obtained. In examples, operation 202 comprises accessing the query corpus and/or document corpus from a data store, such as data store 114 in FIG. 1. In examples, the query corpus comprises an association between each query and a positive document in the document corpus, as discussed above.

Flow progresses to operation 204, where a training step of the model is performed. In some instances, operation 204 comprises performing a predetermined number of training steps, after which it may be determined that the predetermined number of training steps (or other threshold) has been met. Accordingly, at operation 206, the current model (e.g., as was trained at operation 204) is used to perform inference of documents in the document corpus for queries of the query corpus. The model may generate a ranking score for each (query, document) pair, such that a set of highest-ranked documents may be determined for a given query (e.g., comprising a predetermined number of documents or with ranking scores above a predetermined ranking score threshold).

At operation 208, a negative (query, document) pair is selected for each query of the query corpus. In examples, the negative (query, document) pair is randomly selected from the set of highest-ranked documents that was generated at operation 206. As another example, the negative (query, document) pair may be determined based on an associated ranking score that was generated at operation 206. Thus, it will be appreciated that any of a variety of techniques may be used to generate the set of highest-ranked documents at operation 206 and, similarly, to select a negative (query, document) pair for a given query at operation 208.

Flow progresses to operation 210, where a new training dataset is generated. The new training dataset may comprise the set of highest-ranked documents for each query of the query corpus (e.g., as was generated at operation 206). The training dataset may further comprise the negative documents that were selected at operation 208, which may be used as negative examples for training the model at operation 204.

Thus, operations 206-210 are an example of using the noise-contrastive techniques of ANCE to improve model performance as a result of learning from stronger negative examples (e.g., as were ranked using the current state of the model generated at operation 204). An arrow is illustrated from operation 210 to operation 204 to indicate that flow may loop between operations 204-210, such that the described ANCE techniques are applied after every N training steps performed at operation 204.

Eventually, flow progresses from operation 210 to operation 212, where negative documents are aggregated for each query of the query corpus. As discussed above, operation 208 comprises selecting a negative (query, document) pair for each query. Thus, after multiple iterations of operations 204-210, multiple negative documents will have been selected for a given search query. The set of negative documents for each query is aggregated at operation 212.

Accordingly, a final negative document is determined for each search query at operation 214. For example, the final negative document may be sampled from the set of negative documents for a given query that was generated at operation 212 according to NCE sampling. It will be appreciated that any of a variety of other techniques may be used to determine a negative document for a given query using the set of negative documents generated at operation 212.

Flow progresses to operation 216, where the model is tuned according to a loss function. An example loss function is described above, where a positive document vector (e.g., as may be indicated by the query corpus), a negative document vector (e.g., as was selected at operation 214), and a query vector are evaluated according to a cosine similarity function. The example loss function is tuned using several hyperparameters, which may adjust the respective contributions of the query/positive document similarity and query/negative document similarity. However, it will be appreciated that any of a variety of other loss functions may be used.

An arrow is illustrated from operation 216 to operation 204 to similarly indicate that the training illustrated by method 200 is iterative, such that operations 204-216 may be performed multiple times to train the machine learning model. In examples, operations 204-216 are performed a predetermined number of times or, as another example, operations 204-216 are performed until model performance converges. Flow eventually terminates at operation 216.

Figure 3:
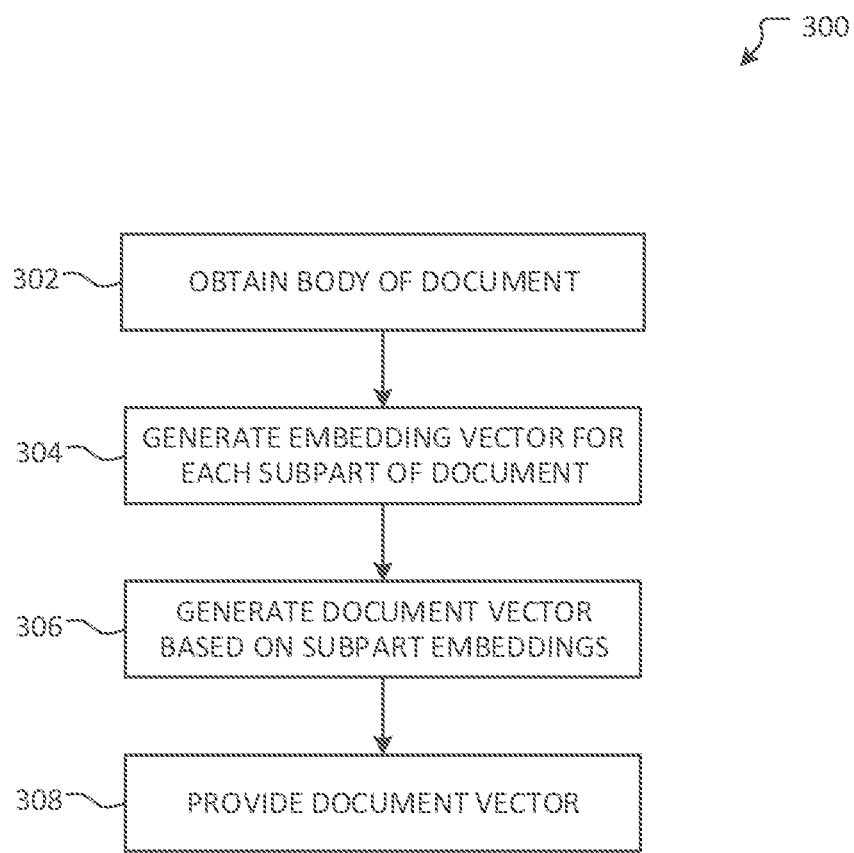
FIG. 3 illustrates an overview of an example method for processing a document to generate a document score.

FIG. 3 illustrates an overview of an example method 300 for processing a document to generate a document score. In examples, aspects of method 300 are performed by a document vectorizer, such as document vectorizer 110 in FIG. 1.

Method 300 begins at operation 302, where a body of a document is obtained. In examples, the body is obtained from a data source, such as document store 118 of data source 104. As another example, the document may be from a data store (e.g., data store 114 in FIG. 1). For example, the document body may have been cached from the data source in the data store. Thus, it will be appreciated that a document body may be obtained from any of a variety of sources using any of a variety of techniques.

Flow progresses to operation 304, where an embedding vector is generated for each subpart of the document body, thereby yielding a bag of encodings for the document. As discussed above, the length of a document may be such that a single embedding vector may not be generated without summarizing, downscaling, or otherwise potentially losing information therein. Accordingly, multiple embedding vectors may be used for the document. For example, the document may be split into multiple subparts (e.g., according to sentence breaks, paragraph breaks, a predetermined number of words or bytes, etc.). In some instances, a vector may be projected into a different dimension using linear projection, such that an average or other combination of the encoding vectors in the different dimension may be generated at operation 306. Embedding vectors for the document subparts may be generated using a transformer-based encoding model, such as the universal sentence encoder or BERT.

At operation 306, a final document embedding vector is generated based on the embedding vectors for the constituent subparts of the document that were generated at operation 304. For example, max-pooling techniques may be used to aggregate embedding vectors for the document subparts into a single embedding vector for the document. In some instances, the encoding model that was applied at operation 304 may further generate a weight for each token of the embedding vector, such that the scalars are passed into softmax operation to generate a probability distribution for each token accordingly. These weights may then be used to sum the vector of each respective token to form the final single vector representation.

Moving to operation 308, the final document vector is provided. As an example, the document vector may be provided for use while training a model, such as at operation 206 of method 200 in FIG. 2. As another example, the final document vector may be stored for later use (e.g., during training and inference) in a data store, such as data store 114 in FIG. 1. Flow terminates at operation 308.

While example embedding techniques are described herein, it will be appreciated that any of a variety of other techniques may be used. For example, a document body need not be split into multiple subparts according to method 300. Rather, in other instances, a document instead be summarized or otherwise processed to generate a single embedding vector that is representative of the document body.

Figure 4:
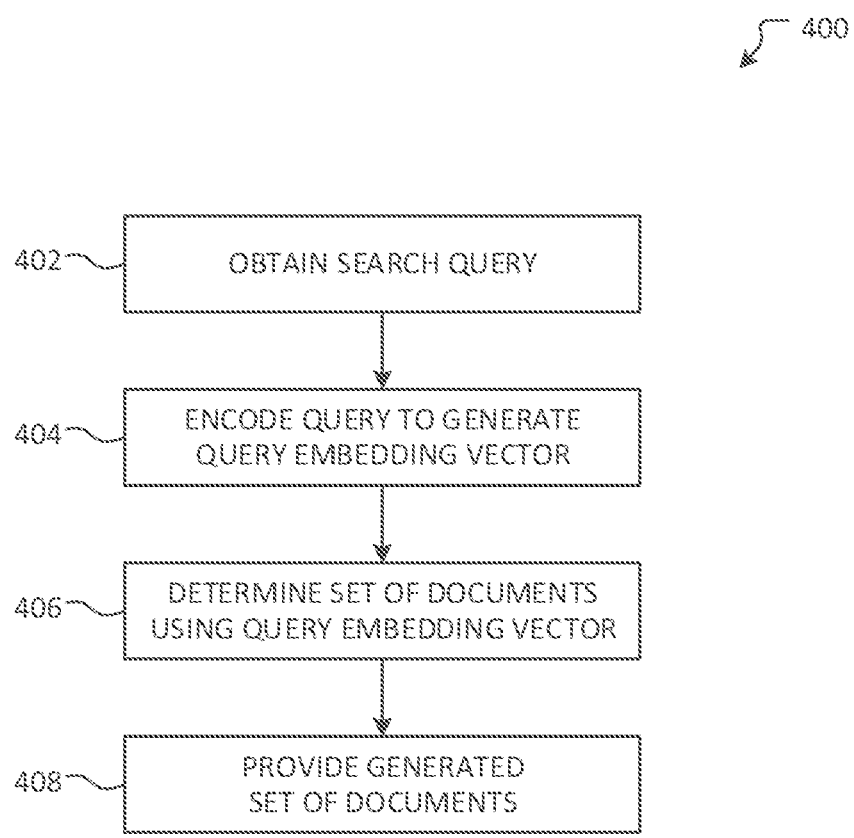
FIG. 4 illustrates an overview of an example method for generating a set of candidate documents responsive to a search query according to aspects of the present disclosure.

FIG. 4 illustrates an overview of an example method 400 for generating a set of candidate documents responsive to a search query according to aspects of the present disclosure. In examples, aspects of method 400 are performed by a query processor, such as query processor 116 in FIG. 1.

Method 400 begins at operation 402, where a search query is obtained. For example, a search query may be received from a client device, such as client device 106 in FIG. 1. The search query may comprise one or more keywords or may be a sentence, among other examples.

At operation 404, the query is encoded to generate a query embedding vector. For example, the query embedding vector may be generated using a transformer-based encoding model, such as the universal sentence encoder or BERT. Flow progresses to operation 406, where a set of documents is determined using the query embedding vector. For example, a dot-product ANN search may be used, such that document embedding vectors are identified using the query embedding vector, thereby generating a set of documents that is responsive to the search query. For example, the document vectors processed at operation 406 may each be a final document vector based on a set of encoding vectors or bag of encodings, as discussed above with respect to operations 304 and 306 of method 300 in FIG. 3. In some instances, the document vectors may have been pre-generated (e.g., by a document vectorizer, such as document vectorizer 110 in FIG. 1).

Moving to operation 408, the generated set of documents is provided. For example, the set of documents may be provided to the client device in response to the search query that was received at operation 402. Providing the set of documents may comprise providing references to the identified documents and/or excerpts from the documents, among other examples. For example, the excerpts may be relevant keywords from the documents. Flow terminates at operation 408.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
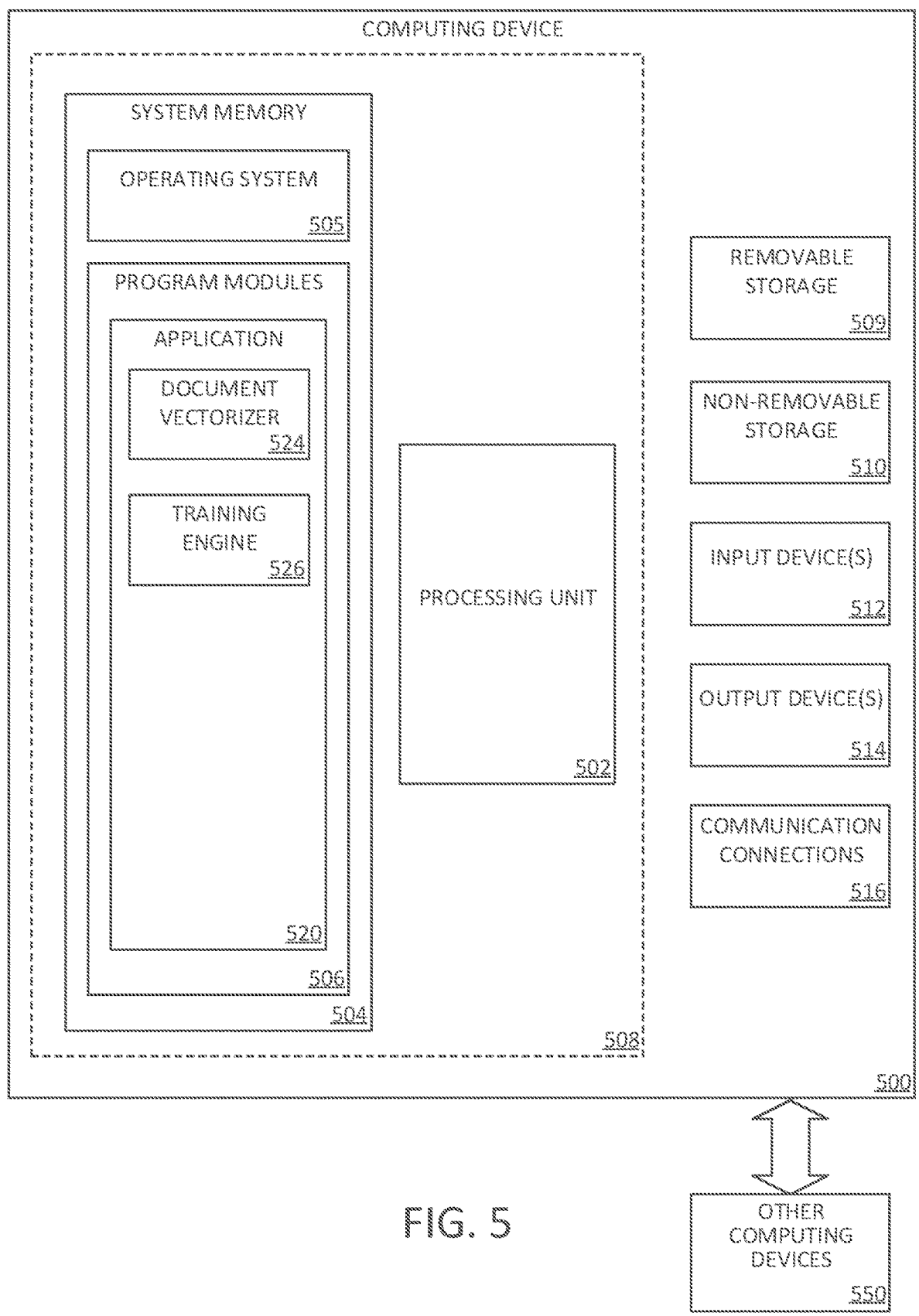
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including devices 102, 104, and 106 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store document vectorizer 524 and training engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
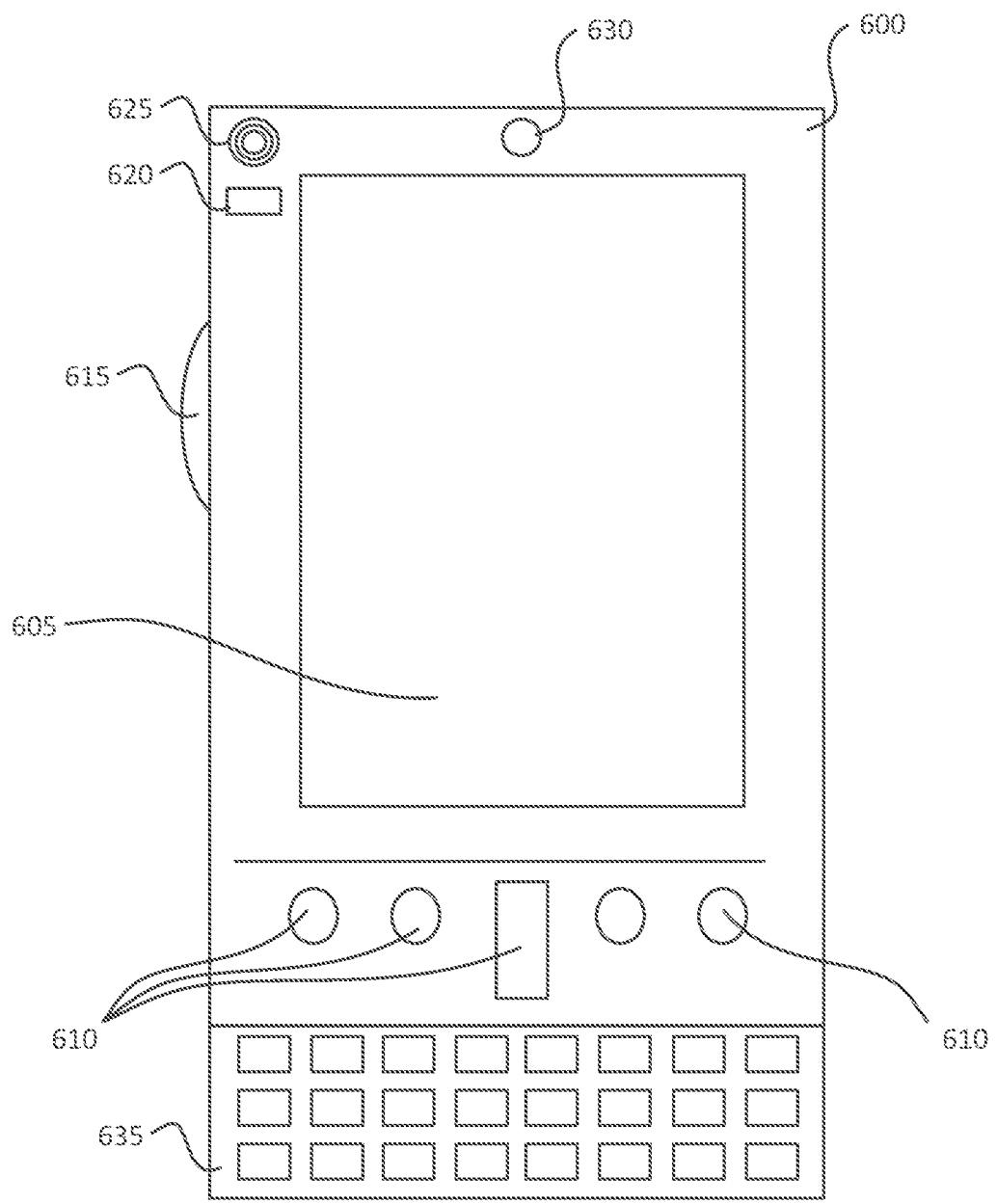
FIGS. 6A and 6B are simplified block diagrams of a mobile computing device with which aspects of the present disclosure may be practiced.
Figure 6B:
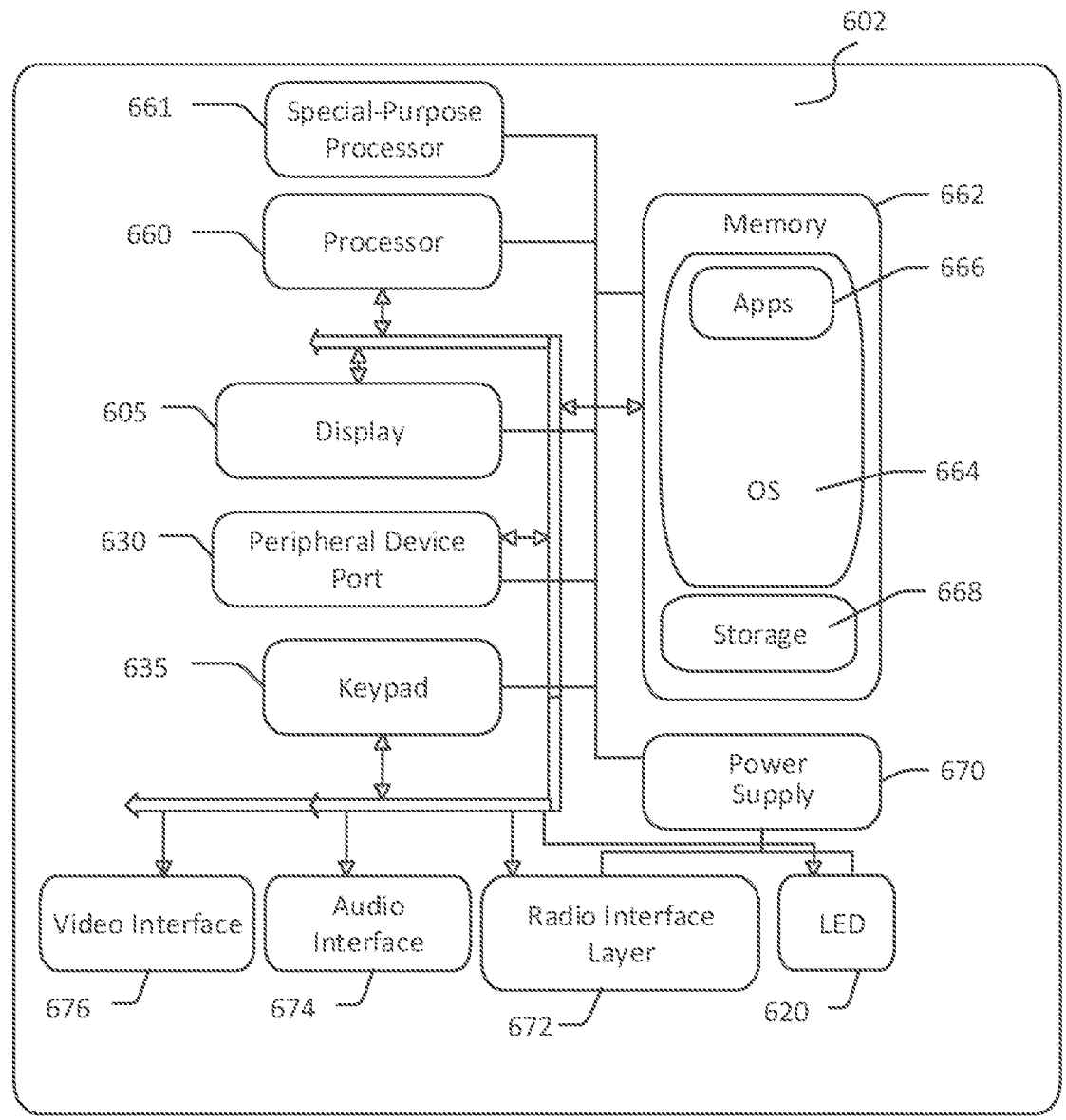

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
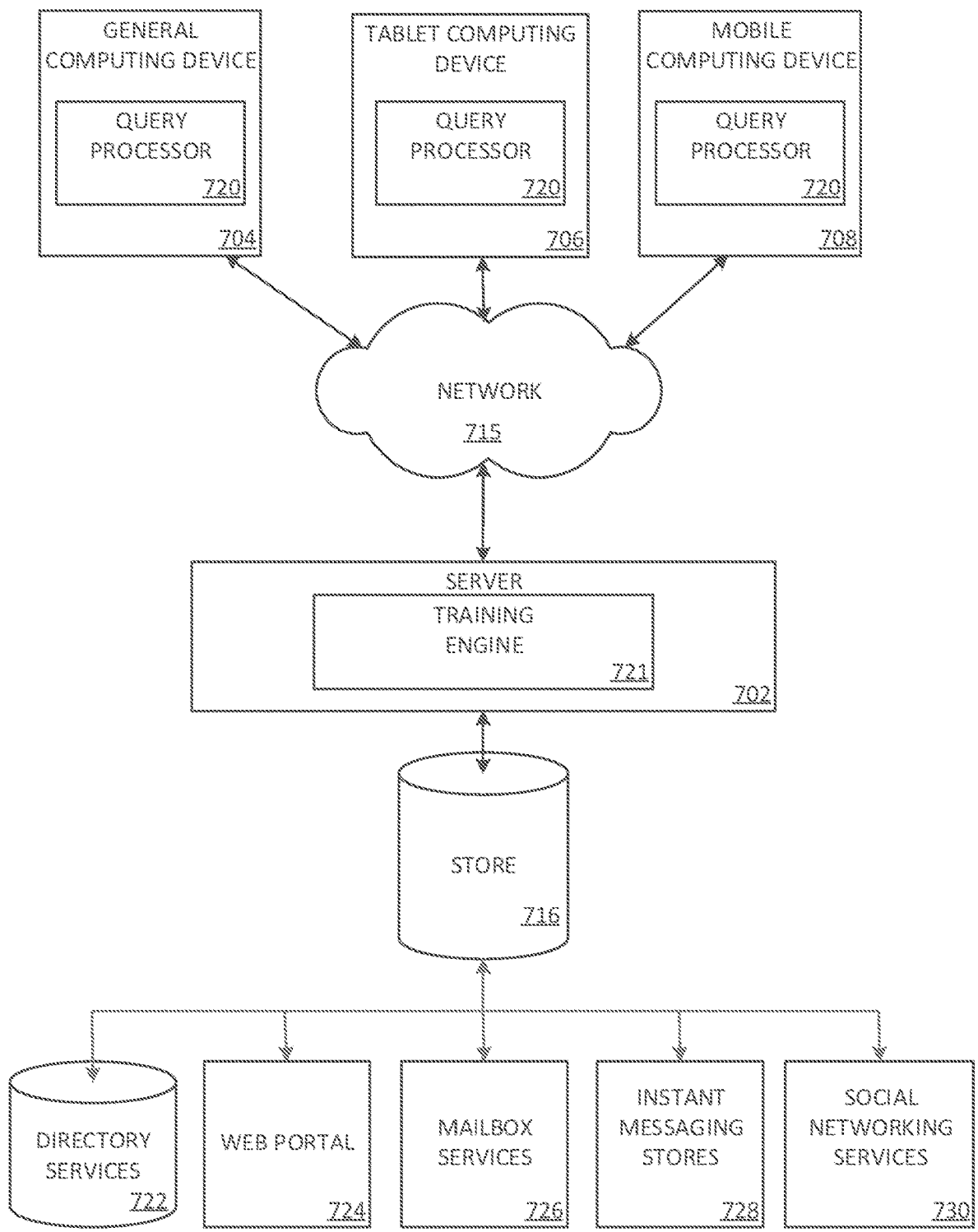
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A query processor 720 may be employed by a client that communicates with server device 702, and/or training engine 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
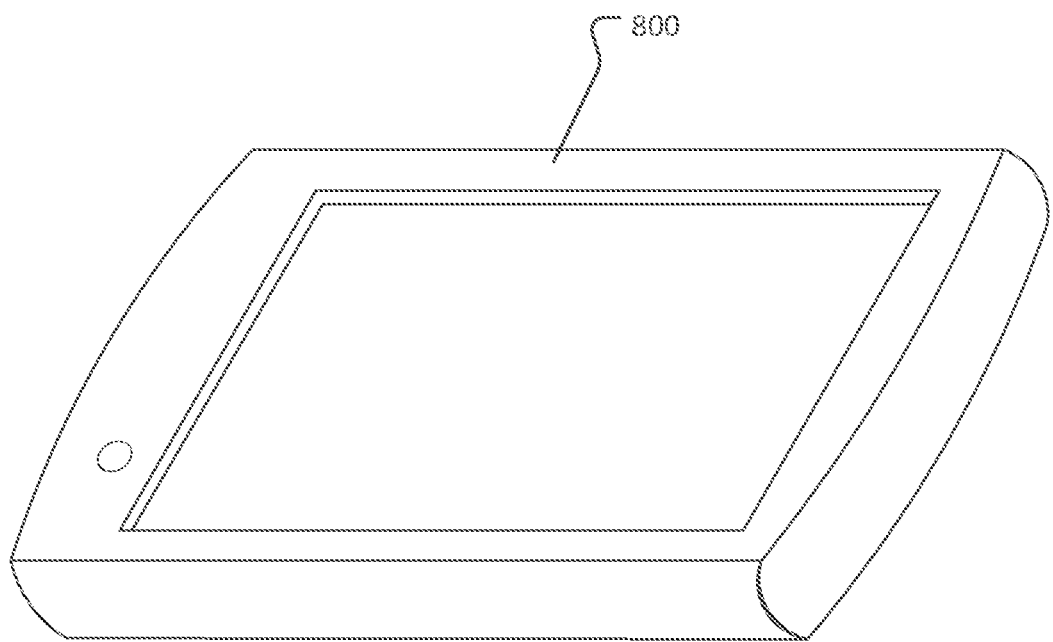
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for generating a model output based on a set of concepts according to at least the examples provided in the sections below:

(A1) In one aspect, some embodiments include a system (e.g., 500, 600) comprising: at least one processor (e.g., 502, 660, 661); and memory (e.g., 504, 662) storing instructions that, when executed by the at least one processor, causes the system to perform a set of operations. The set of operations comprises: training (e.g., FIG. 2) a machine learning model based on a training dataset comprising a search query corpus and the document corpus, wherein training the machine learning model comprises: generating (e.g., 206), using the machine learning model, a set of ranking scores for documents of the document corpus based on a first search query of the search query corpus; refining (e.g., 208, 210) the training dataset based on the generated set of ranking scores; determining (e.g., 214) a first negative document from a set of negative documents for the first search query; and evaluating (e.g., 216) a loss function using the first negative document to train the machine learning model; obtaining (e.g., 402) a request comprising a second search query; generating (e.g., 404, 406), using the trained machine learning model, a set of documents from the document corpus that is responsive to the second search query; and providing (e.g., 408), in response to the request, the set of documents that is responsive to the second search query.

(A2) In some embodiments of the system of A1, the set of operations further comprises: generating (e.g., FIG. 3), for each document of the document corpus, a document embedding vector based on an embedding vector of at least one subpart of the document.

(A3) In some embodiments of the system of A1 or A2, refining the training dataset comprises, retaining (e.g., 210), for the first search query, a subset of documents of the document corpus in the training dataset based on the set of ranking scores; and determining (e.g., 214) a second negative document for the first search query from the document corpus, wherein the second negative document is part of the set of negative documents for the first search query.

(A4) In some embodiments of the system of A3, the second negative document is randomly determined.

(A5) In some embodiments of the system of A1-A4, the first negative document is determined (e.g., 214) from the set of negative documents for the first search query using noise-contrastive estimation.

(A6) In some embodiments of the system of A1-A5, the loss function evaluates a first cosine similarity between a query embedding vector for the first search query and a first document embedding vector for the first negative document.

(A7) In some embodiments of the system of A6, the loss function further evaluates a second cosine similarity between the query embedding vector and a second document embedding vector for a positive document associated with the first search query.

(A8) In some embodiments of the system of A1-A7, generating (e.g., 406) the set of documents that is responsive to the second search query comprises: performing an approximate nearest neighbor search using a query embedding vector for the second search query and document embedding vectors for documents of the document corpus to generate the set of documents; and ranking the set of documents according to associated ranking scores.

(B1) In another aspect, some embodiments include a method (e.g., FIG. 4) for generating a set of documents responsive to a search query. The method comprises: obtaining (e.g., 402) a request comprising a search query; generating (e.g., 404) a query embedding vector for the search query; generating (e.g., 406), based on the query embedding vector and document embedding vectors for documents of a document corpus, a set of documents responsive to the search query; ranking (e.g., 406) the set of documents according to associated ranking scores, and providing (e.g., 408), in response to the request, the ranked set of documents that is responsive to the search query.

(B2) In some embodiments of the method of B1, generating the set of documents responsive to the search query comprises processing the query embedding vector and the document embedding vectors using an approximate nearest neighbor search.

(B3) In some embodiments of the method of B1 or B2, a document embedding vector for a document of the document corpus is a pre-generated document embedding vector based on a plurality of embedding vectors, wherein each embedding vector of the plurality of embedding vectors is associated with a subpart of the document.

(B4) In some embodiments of the method of B1-B3, a document embedding vector for a document of the document corpus is associated with a body of the document.

(B5) In some embodiments of the method of B1-B4, providing the ranked set of documents comprises providing a subpart of a document in the ranked set of documents.

(C1) In a further aspect, some embodiments include a method for machine learning model-based search processing. The method comprises: training (e.g., FIG. 2) a machine learning model based on a training dataset comprising a search query corpus and the document corpus, wherein training the machine learning model comprises: generating (e.g., 206), using the machine learning model, a set of ranking scores for documents of the document corpus based on a first search query of the search query corpus; refining (e.g., 208, 210) the training dataset based on the generated set of ranking scores; determining (e.g., 214) a first negative document from a set of negative documents for the first search query; and evaluating (e.g., 216) a loss function using the first negative document to train the machine learning model; obtaining (e.g., 402) a request comprising a second search query; generating (e.g., 404, 406), using the trained machine learning model, a set of documents from the document corpus that is responsive to the second search query, and providing (e.g., 408), in response to the request, the set of documents that is responsive to the second search query.

(C2) In some embodiments of the method of C1, the method further comprises: generating (e.g., FIG. 3), for each document of the document corpus, a document embedding vector based on an embedding vector of at least one subpart of the document.

(C3) In some embodiments of the method of C1 or C2, refining the training dataset comprises: retaining (e.g., 210), for the first search query, a subset of documents of the document corpus in the training dataset based on the set of ranking scores; and determining (e.g., 214) a second negative document for the first search query from the document corpus, wherein the second negative document is part of the set of negative documents for the first search query.

(C4) In some embodiments of the method of C1-C3, the first negative document is determined (e.g., 214) from the set of negative documents for the first search query using noise-contrastive estimation.

(C5) In some embodiments of the method of C1-C4, the loss function evaluates a first cosine similarity between a query embedding vector for the first search query and a first document embedding vector for the first negative document.

(C6) In some embodiments of the method of C1-C5, the loss function further evaluates a second cosine similarity between the query embedding vector and a second document embedding vector for a positive document associated with the first search query.

(C7) In some embodiments of the method of C1-C6, generating (e.g., 406) the set of documents that is responsive to the second search query comprises, performing an approximate nearest neighbor search using a query embedding vector for the second search query and document embedding vectors for documents of the document corpus to generate the set of documents, and ranking the set of documents according to associated ranking scores.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
    training a machine learning model based on a training dataset comprising a search query corpus and the document corpus, wherein training the machine learning model comprises:
        generating, for each document of the document corpus, a document embedding vector based on a plurality of embedding vectors that are each associated with a document subpart of a given document;
        generating, using the machine learning model, a set of ranking scores for documents of the document corpus based on a first search query of the search query corpus and a document embedding vector for each of the documents;
        refining the training dataset based on the generated set of ranking scores;
        determining a first negative document from a set of negative documents for the first search query;
        evaluating a loss function using the first negative document to train the machine learning model, thereby yielding an updated machine learning model; and
        in a subsequent training iteration:
            further refining the training dataset based on the updated machine learning model to generate a second training dataset; and
            further training the updated machine learning model based on the second data set;
    obtaining a request comprising a second search query;
    generating, using the trained machine learning model, a set of documents from the document corpus that is responsive to the second search query; and
    providing, in response to the request, the set of documents that is responsive to the second search query.

2. The system of claim 1, wherein refining the training dataset comprises:
retaining, for the first search query, a subset of documents of the document corpus in the training dataset based on the set of ranking scores; and
determining a second negative document for the first search query from the document corpus, wherein the second negative document is part of the set of negative documents for the first search query.

3. The system of claim 2, wherein the second negative document is randomly determined.

4. The system of claim 1, wherein the first negative document is determined from the set of negative documents for the first search query using noise-contrastive estimation.

5. The system of claim 1, wherein the loss function evaluates a first cosine similarity between a query embedding vector for the first search query and a first document embedding vector for the first negative document.

6. The system of claim 5, wherein the loss function further evaluates a second cosine similarity between the query embedding vector and a second document embedding vector for a positive document associated with the first search query.

7. The system of claim 1, wherein generating the set of documents that is responsive to the second search query comprises:
performing an approximate nearest neighbor search using a query embedding vector for the second search query and document embedding vectors for documents of the document corpus to generate the set of documents; and
ranking the set of documents according to associated ranking scores.

8. A method for generating a set of documents responsive to a search query, comprising:
obtaining a request comprising a search query;
generating a query embedding vector for the search query;
generating, based on the query embedding vector and document embedding vectors for documents of a document corpus, a set of documents responsive to the search query, wherein a document embedding vector of the document embedding vectors is generated based on a plurality of embedding vectors that are each associated with a document subpart of a given document;
evaluating, using a loss function, a first cosine similarity between the query embedding vector for a first search query and a first document embedding vector for a first negative document and a second cosine similarity between the query embedding vector for a second search query and a second document embedding vector for a positive document associated with the first search query;
generating, the set of documents responsive to the second search query; and
ranking the set of documents according to associated ranking scores; and providing, in response to the request, the ranked set of documents that is responsive to the search query.

9. The method of claim 8, wherein generating the set of documents responsive to the search query comprises processing the query embedding vector and the document embedding vectors using an approximate nearest neighbor search.

10. The method of claim 8, wherein a document embedding vector for a document of the document corpus is a pre-generated document embedding vector based on a plurality of embedding vectors, wherein each embedding vector of the plurality of embedding vectors is associated with a subpart of the document.

11. The method of claim 8, wherein a document embedding vector for a document of the document corpus is associated with a body of the document.

12. The method of claim 8, wherein providing the ranked set of documents comprises providing a subpart of a document in the ranked set of documents.

13. A method for machine learning model-based search processing, comprising:
training a machine learning model based on a training dataset comprising a search query corpus and the document corpus, wherein training the machine learning model comprises:
generating, using the machine learning model, a set of ranking scores for documents of the document corpus based on a first search query of the search query corpus;
refining the training dataset based on the generated set of ranking scores;
determining a first negative document from a set of negative documents for the first search query;
evaluating a loss function using the first negative document to train the machine learning model, thereby yielding an updated machine learning model; and
in a subsequent training iteration:
further refining the training dataset based on the updated machine learning model to generate a second training data set; and
further training the updated machine learning model based on the second data set;
obtaining a request comprising a second search query;
generating, using the trained machine learning model, a set of documents from the document corpus that is responsive to the second search query; and
providing, in response to the request, the set of documents that is responsive to the second search query.

14. The method of claim 13, further comprising:
generating, for each document of the document corpus, a document embedding vector based on an embedding vector of a plurality of subparts of the given document.

15. The method of claim 13, wherein refining the training dataset comprises:
retaining, for the first search query, a subset of documents of the document corpus in the training dataset based on the set of ranking scores; and
determining a second negative document for the first search query from the document corpus, wherein the second negative document is part of the set of negative documents for the first search query.

16. The method of claim 13, wherein the first negative document is determined from the set of negative documents for the first search query using noise-contrastive estimation.

17. The method of claim 13, wherein the loss function evaluates a first cosine similarity between a query embedding vector for the first search query and a first document embedding vector for the first negative document.

18. The method of claim 17, wherein the loss function further evaluates a second cosine similarity between the query embedding vector and a second document embedding vector for a positive document associated with the first search query.

19. The method of claim 13, wherein generating the set of documents that is responsive to the second search query comprises:
performing an approximate nearest neighbor search using a query embedding vector for the second search query and document embedding vectors for documents of the document corpus to generate the set of documents; and
ranking the set of documents according to associated ranking scores.

20. The system of claim 1, wherein training the machine learning model further comprises refining the training dataset in a subsequent training iteration based on a current iteration of the machine learning model.

* * * * *